United States Patent [19]

Dragonette et al.

[11] Patent Number: 4,476,549
[45] Date of Patent: Oct. 9, 1984

[54] CALIBRATION METHOD FOR ACOUSTIC SCATTERING MEASUREMENTS USING A SPHERICAL TARGET

[75] Inventors: Louis R. Dragonette, Upper Marlboro; Laurence J. Frank, Mt. Rainier; Susan K. Numrich, Kensington, all of Md.

[73] Assignee: The United States of America as represented by the Secretary of the Navy, Washington, D.C.

[21] Appl. No.: 364,098

[22] Filed: Mar. 31, 1982

[51] Int. Cl.³ .......................................... H04B 17/00
[52] U.S. Cl. ..................................... 367/13; 73/1 DV
[58] Field of Search ........................ 367/13; 73/1 DV

[56] References Cited

U.S. PATENT DOCUMENTS 4,081,216  3/1978  Cook .
4,097,837  6/1978  Cyr .
4,160,228  7/1979  Hix et al. .
4,187,488  2/1980  Anderson et al. .

OTHER PUBLICATIONS

NASA Tech. Briefs, Spring 1981, p. 59.

Primary Examiner—Richard A. Farley
Attorney, Agent, or Firm—Robert F. Beers; William T. Ellis; John L. Forrest

[57] ABSTRACT

A method for calibrating acoustic backscattering instrumentation utilizing a spherical body as a standard target. A spherical body made of high specific acoustic impedance material, such as tungsten carbide, is positioned a given distance from a source/receiver transducer which is energized to produce a short acoustic pulse directed toward the sphere. Acoustic signals reflected from the sphere are detected by the transducer and processed in the time domain to separate the rigid portion of the return from the elastic portions. The rigid portion is corrected for the transducer to sphere distance, the reflectivity of the sphere, and for the radius of the sphere. The resultant corrected signal represents the incident acoustic pulse produced by the transducer.

6 Claims, 7 Drawing Figures

CALIBRATION METHOD FOR ACOUSTIC SCATTERING MEASUREMENTS USING A SPHERICAL TARGET

BACKGROUND OF THE INVENTION

The present Invention relates, in general, to a novel method for calibrating acoustic scattering measurements utilizing a spherical target.

DESCRIPTION OF THE PRIOR ART

Accurate calibration techniques are of vital importance in ultrasonic measurements. When short or transient pulses are used as sound sources, accurate calibration depends upon the measurement of the source pulse at the position occupied by the center of the scattering target in the absence of the target body. Only under the most ideal circumstances is this type of measurement possible. Therefore, alternative calibration methods have been developed. These approaches use a replica of the incident pulse measured in either of two ways: by placing an acoustic sensor between the source and target to capture the incident pulse in transit to the target; or by temporarily positioning a standard target as a reflector in the path of the incident sound.

If an acoustic sensor is placed between the source and the target, it must be small enough for the acoustic field to repair itself (after being diffracted around the sensor) before reaching the target. The loss in acoustic pressure resulting from the presence of the sensor in the incident field must be negligible. In many practical situations these conditions cannot be met.

Of the available standard targets for use as a reflector, the most popular for pulse measurements is the flat plate. If the plate were a perfect mirror (both perfectly reflective and rigid), the reflected return would be a replica of the incident pulse and would require only a correction for distance. Unfortunately, no solid material is perfectly rigid and reflective in water. Elastic properties of the material allow the incident sound to couple to the plate instead of being totally reflected back to the source. Additional problems involve the size and the positioning of the plate. The plate must be large enough to avoid illumination of its edges, thick enough to provide separation between front and rear surface echoes and it must be exactly normal to the incident sound field. Finally, amplitude corrections based on the reflection coefficient of the plate must be made.

As early as 1949, attempts were made to employ a sphere as a standard target. The sphere is a logical choice for a calibration object because it is a finite three-dimensional target whose response is independent of rotation (all sides are equally normal to the incident sound field and there are no edges to be avoided) and because exact analytic scattering solutions can be obtained for the spherical geometry.

Consideration of the sphere as a standard in comparative target strength (TS) measurements depends on the invarience of the target strength of a rigid sphere with frequency. The target strength (TS) of a sphere is calculated as follows:

$$TS = 20 \log (a/2) \qquad (1)$$

where a is the radius of the sphere expressed in yards.

Equation (1) expresses the well-known fact that for $a/\lambda > 1$, where $\lambda$ is the wavelength of the incident sound wave, the diffracted or creeping wave component of the scattering by a rigid sphere is negligible and the back scattered response is made up almost entirely of specular reflection.

The idea of using a standard sphere in lake or ocean measurements has all but been abandoned in the art for such practical considerations as size, fabrications, and mounting. Additionally, no sphere in water satisfies rigid boundary conditions and, in fact, the computed and measured responses for submerged solid and hollow metal spheres show steady-state variations from equation (1) of as much as 20 db. Thus all known prior art attempts to use a sphere as a calibration target have at best been approximations in that they all attempt to average out the elastic effects in some way.

Differential measurement techniques, which enable absolute scattering measurements to be made without the necessity of a calibrated receiver, are standardly used in scattering experiments. Absolute calibration can be avoided by using the same transducer to measure both the reflected and incident pressure amplitudes, and expressing both the analytic and measured results as a ratio of these amplitudes.

A typical scattering experiment is schematically illustrated in FIG. 1. The target illustrated as a sphere is centered at $P_0(X_0, Y_0, F_0)$ and the backscattered return is measured by a receiver at $P_1(X_1, Y_0, F_0)$. The incident pressure amplitude can be obtained with relative ease when the source and receiver are separate transducers, as described above. Similarly, where the source and receiver are the same transducer, a replica of the incident pulse may be obtained from a standard calibration target interposed between the source/receiver transducer and the target, as described above.

Disclosed herein is a novel method for calibrating acoustic scattering measurements wherein a sphere is used as a calibration target to be interposed between a source/receiver transducer and a test target. According to the method of the present Invention, spherical targets can be accurately and conveniently utilized as standard targets in laboratory measurements which utilize broadband techniques and a single source/receiver transducer.

SUMMARY OF THE INVENTION

The Inventors of the present Invention have discovered through theoretical and experimental work that the echo returned from an elastic body is the superposition of the elastic response of the body on the response of a rigid body of the same shape. The use of a sphere as an accurate calibration target thus depends upon the ability to separate the portion of the echo containing the purely rigid response from the remaining portions of the echo which contain the elastic returns. The purely rigid response obtained represents the spectral components of the acoustic signal incident upon the target sphere over a wide range of frequencies.

The novel calibration method of the present Invention includes the steps of positioning a spherical body made of high specific acoustic impedance material, such as tungsten carbide, a given distance from a source/receiver transducer which is energized to produce a short acoustic pulse directed toward the sphere. Acoustic signals reflected from the sphere are detected by the transducer and processed in the time domain to separate the rigid portions of the return from the elastic portions. The rigid portion of the return when suitably corrected, represents the incident acoustic pulse produced by the transducer.

BRIEF DESCRIPTION OF THE DRAWINGS

A more complete appreciation of the Invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
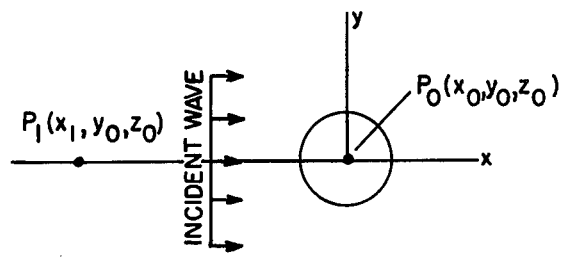
FIG. 1 schematically illustrates a typical scattering experiment.

The steady-state, backscattered response or Form Function of a rigid spherical target, such as the target illustrated in FIG. 1, is as follows:

$$|f_\infty| = (2r/a)(P_r/P_0) \tag{2}$$

where r is the range, a is the radius of the target, $P_r$ is the reflected pressure amplitude measured at $P_1(X_1, Y_0, Z_0)$, and $P_0$ is the incident pressure amplitude measured at $P_0(X_0, Y_0, Z_0)$. The term "Form Function" refers to a dimensionless quantity or function which represents the backscattered pressure amplitude of an acoustical target as a function of frequency. Except for very low frequencies, the steady-state Form Function $|f_\infty|$ given by equation (2) is equal to 1. Thus the incident steady-state pressure amplitude can be determined from equation (2) as follows:

$$P_0 = (2r/a) P_r \tag{3}$$

Steady-state measurements of $|f_\infty|$ when the target is an elastic sphere are known from the prior art to closely agree with theoretical models. The present Inventors have determined that measurements of the steady-state Form Function can also be made utilizing short pulse transient techniques, with the advantage that $|f_\infty|$ can be obtained over a broad range of frequencies from a single measurement.

The Form Function of a three-dimensional target illuminated by a short pulse $P_i(t)$ is given by:

$$|f_\infty(ka)| = (2r/a)[|g_r(ka)|/|g_i(ka)|] \tag{4}$$

where $g_i(ka)$ is the transform of the incident pulse, $P_0(t)$, $g_r(ka)$ is the transform of the reflected echo $p_r(t)$, and ka is the wave number, a dimensionless quantity equal to $2\pi a/\lambda$. Comparisons between transient experiments and exact theory for elastic spheres, absorbing spheres, and infinite elastic cylinders, have demonstrated excellent agreement.

For a rigid sphere of radius $a_s$ positioned at a range $r_s$ from a source/receiver transducer, the backscattered Form Function as a function of frequency is as follows:

$$|f_\infty^s(\nu)| = (2r_s/a_s)[|g_s(\nu)|/|g_i(\nu)|] \tag{5}$$

where $g_i$ and $g_s$ are, respectively, the Fourier transforms of the incident pulse and of the pulse reflected from the rigid sphere. For frequencies at which the Franz wave does not contribute significantly to backscattering $|f_\infty^s(\nu)| = 1$ and:

$$|g_i(\nu)| = (2r_s/a_s)|g_s(\nu)|, \tag{6}$$

which is the Fourier analogue of Equation (3) above.

The Form Function of any three-dimensional target at a range $r_T$ from a source/receiver transducer is given in terms of its characteristic dimension $a_T$ by:

$$|f_\infty^T(\nu)| = (2r_T/a_T)[|g_T(\nu)|/|g_i^T(\nu)|]. \tag{7}$$

Here $g_T$ is the Fourier transform of the backscattered return from the target under investigation and $g_i^T$ is the transform of the wave incident on the target. Assuming 1/r spreading, the transforms of the wave incident at the reference sphere and at the target are related by $$g_i^T = g_i r_s / r_T \tag{8}$$

and the far field Form Function of the target, $f_\infty^T$, can be obtained by comparing its reflection to that of the rigid sphere from Eqs. (6) and (7) as follows:

$$|f_\infty^T(\nu)| = (r_T^2/r_s^2)(a_S/a_T)[|g_T(\nu)|/|g_s(\nu)|]. \tag{9}$$

Thus the Form Function of a target under investigation may be determined from the Fourier transform of the pulse reflected from a rigid sphere and the Fourier transform of the pulse reflected from the target under investigation using Equation (9).

Figure 2A:
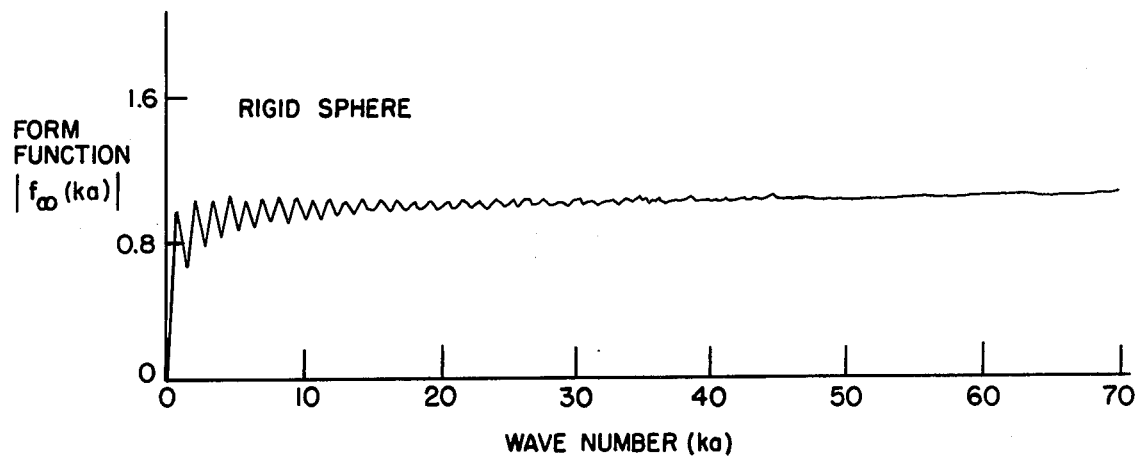
FIG. 2(A) is a plot of the Form Function of a rigid spherical target as a function of the wave number ($ka=2\pi a/\lambda$)
Figure 2B:
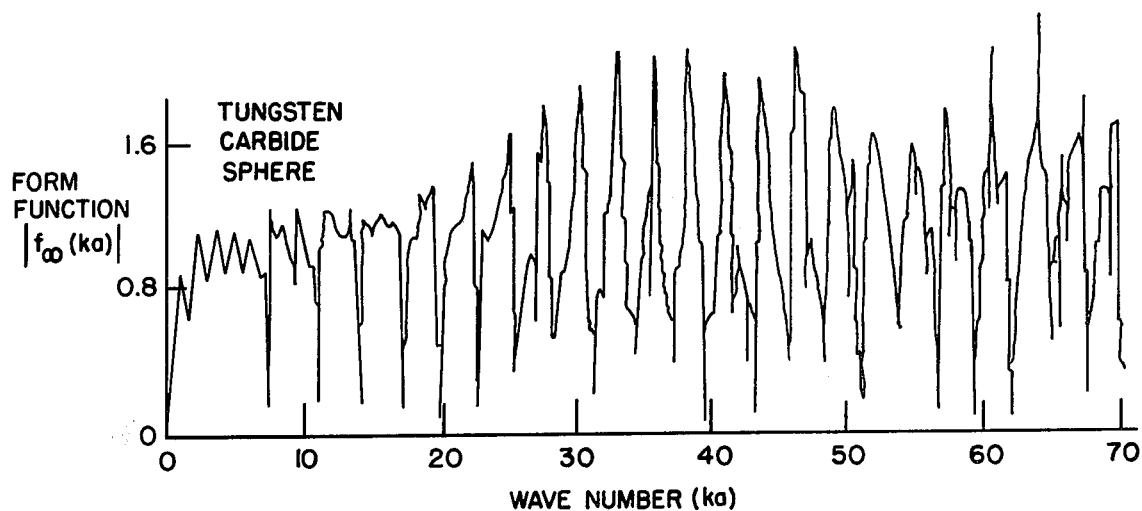
FIG. 2(B) is a plot of the Form Function of a tungsten carbide spherical target as a function of the wave number ($Ka=2\pi a/\lambda$)

Unfortunately, no sphere in water is rigid, even one made of a material having a high specific acoustic impedance, such as tunsten carbide. This can be verified by comparing calculations of the Form Functions for a tungsten carbide sphere and for a rigid sphere. The exact normal mode series solutions can be used to analytically obtain the elastic and rigid Form Functions for spherical targets as is well known in the art. FIG. 2(A) is a plot of the calcuated Form Function for a rigid sphere plotted over the range of $0 \le ka \le 70$. Similarly, FIG. 2(B) is a plot of the calculated Form Function for a tungsten carbide (elastic) sphere plotted over the same range. Significant differences between the steady state solutions for the rigid and tungsten carbide curves exist over the range $ka > 8$, and these differences will continue until acoustic absorption in the material becomes significant. For the purposes of the present disclosure, acoustic absorption in tungsten carbide can be considered to be insignificant.

A cursory look at the curves shown in FIGS. 2(A) and 2(B) would seem to indicate that a tungsten carbide sphere could be used as a standard reflector only in the region $ka \le 7.5$, since this is the region over which the rigid and elastic responses are most nearly the same; however this is not the case. The present Inventors have discovered that the scattering from an elastic body, such as a sphere, can be described in terms of a background of rigid-body scattering onto which resonant or elastic behavior is superimposed. The rigid body and elastic responses cannot be conveniently separated in a steady-state measurement, but they can be isolated in short pulse or broadband measurements. This isolation can be achieved even in the wave number (ka) range over which deep nulls and large peaks occur in the Form Function.

Figure 3:
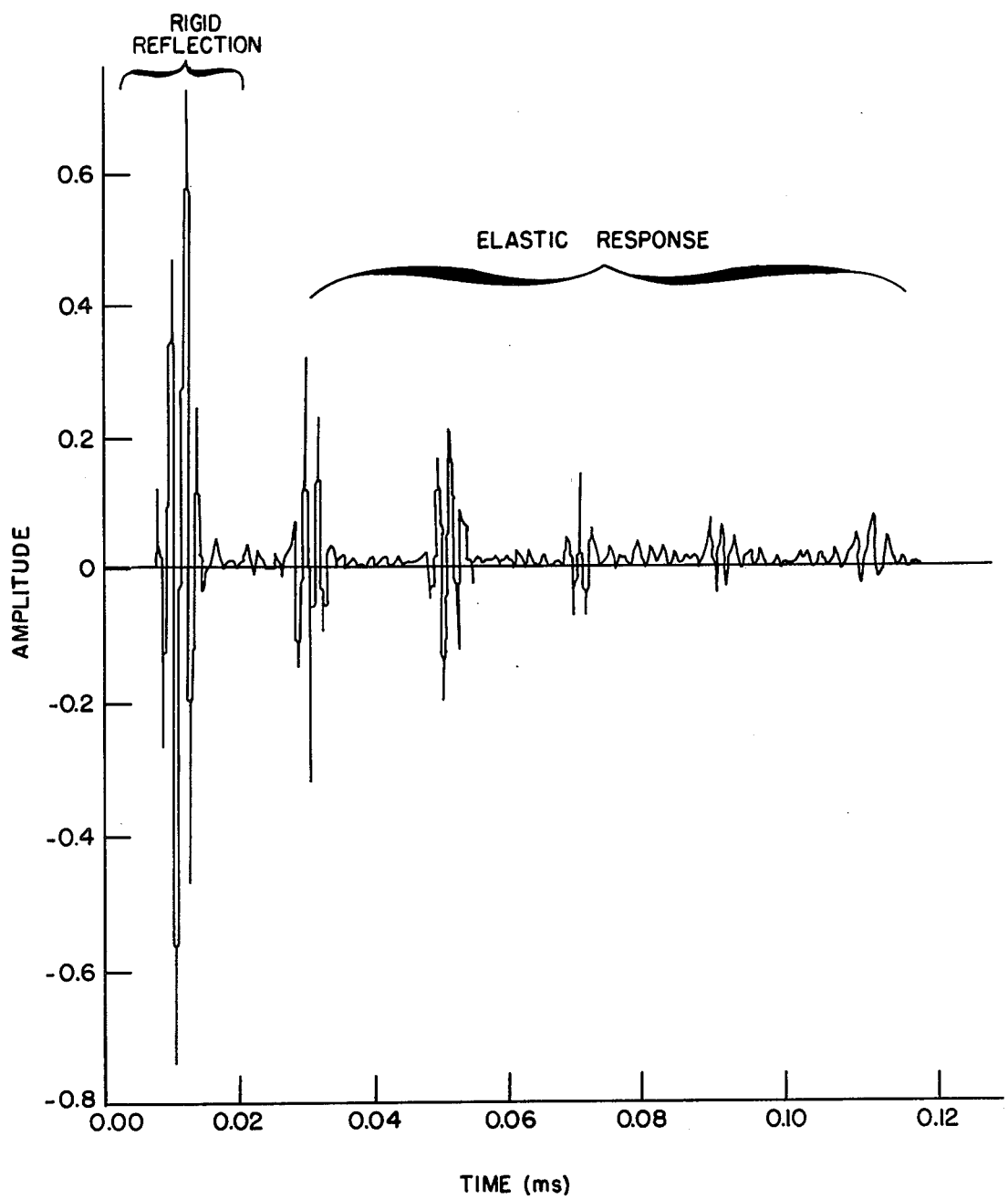
FIG. 3 is a plot of the time domain response of a tungsten carbide spherical target to a short incident acoustical pulse.

FIG. 3 shows the response of a 2.54 cm diameter tungsten carbide sphere to a short incident pulse. The source/receiver transducer was driven by a square wave from a Panametrics Model 5055 Pulse/Receiver, and was located at a range of 73 cm from the sphere. The reflected echoes were obtained in digital form by a Bomation model 8100 analog-to-digital converter interfaced to a PDP 11/34 A computer. The center frequency of the echoes seen in FIG. 3 is 0.5 MHz, and the sampling rate used was 0.5 νs. The response seen in FIG. 3 is made up of several separated echoes. The first echo is labeled rigid reflection and, as will be shown below, this echo is an excellent replica of the return that a truly rigid sphere would give. As discussed above, it has been determined that the steady-state reflection from spheres and cylinders is made up of a rigid body return on to which the elastic response is superimposed. In FIG. 3 the rigid reflection is separated in time from the elastic echoes; moreover, the acoustic energy which generated the series of elastic echoes enters the sphere at critical angles off of normal incidence so that the backscattered specular reflection replicates a rigid sphere return both in amplitude and frequency content.

A simple demonstration that the return labeled rigid reflection in FIG. 3 is a replica of the return from a rigid sphere can be given by obtaining the Form Function for a tungsten carbide sphere from:

$$|f_\infty(ka)| = (2r/a)[|g_r(ka)|/|g_1(ka)|]. \quad (10)$$

In Equation (10), $g_1$ is the transform of only the first or rigid echo seen in FIG. 3, and $g_r$ is the transform of the entire return given in FIG. 3. The Fourier transforms of the initial or rigid return, and of the entire reflected echo were computed, and the operations described in Equation (10) were carried out on a computer. A comparison of the Form Function empirically obtained by this method and a computation made from exact theory is given in FIG. 4, and quantitative agreement is obtained over the range $14 < ka < 40$. A similar, higher frequency experiment was performed on a 2.46 cm diameter sphere at a range of 110 cm. The center frequency of the echoes in this latter experiment was 1.0 MHz, and the sampling rate was 0.2 μs. A comparison of the analytic and measured results over the range $40 < ka < 70$ is seen in FIG. 5. The broad ka range covered by the two experiments, whose results are given in FIGS. 4 and 5, also evinces the efficiency and accuracy of using the broadband, short pulse technique to obtain the steady-state response of a target.

Figure 4:
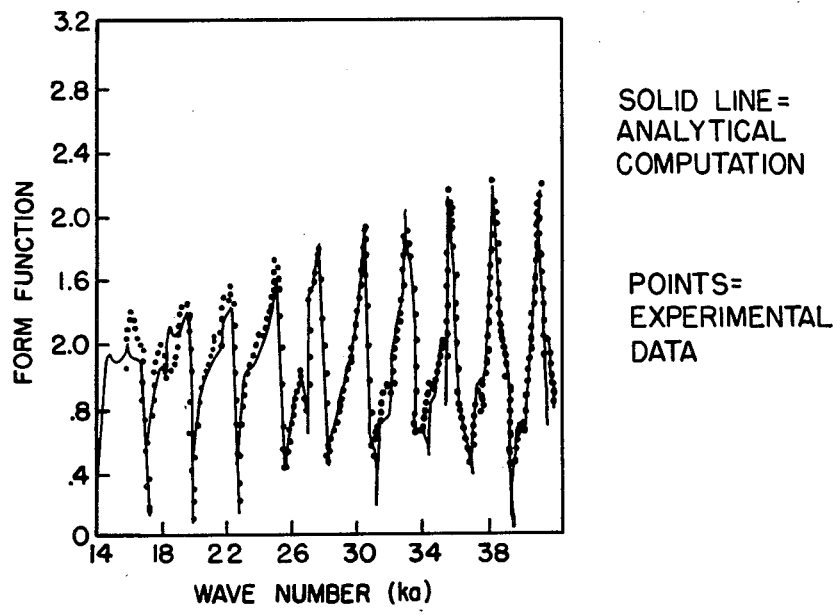
FIG. 4 is a plot of the calculated and measured Form Functions for a spherical tungsten carbide target over the wave number range of $14 < ka < 40$.
Figure 5:
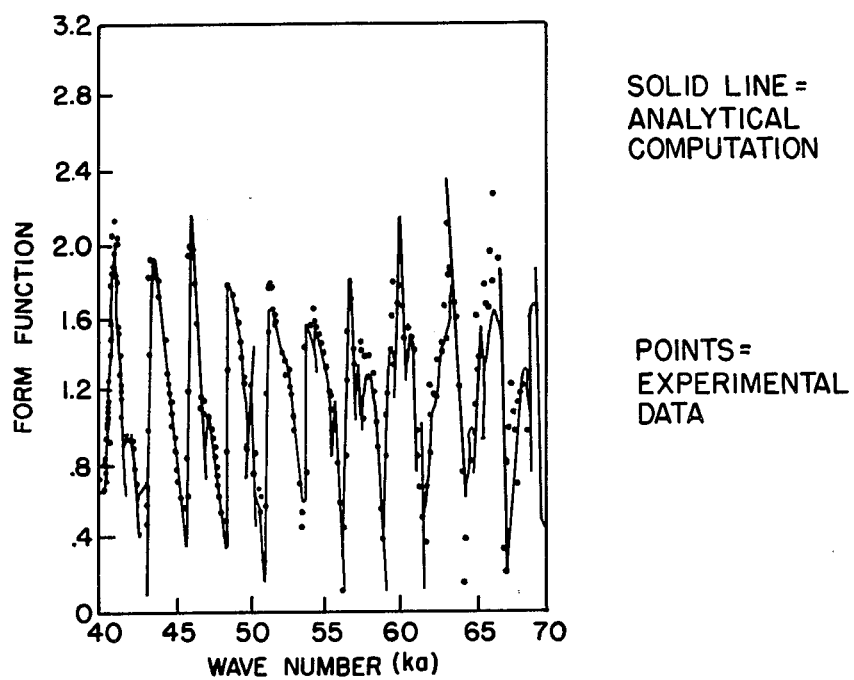
FIG. 5 is a plot of the calculated and measured Form Functions for a spherical tungsten carbide target over the wave number range of $40 < ka < 70$.

The results illustrated in FIGS. 3 through 5 demonstrate that tungsten carbide spheres can be used as standard targets in differential broadband measurements. The steady-state response, or Form Function of the sphere, is made up of the long pulse interference of echoes such as seen in FIG. 3, and differs greatly from the response of a rigid sphere. The calibration method works because the rigid body and elastic scattering mechanisms which make up the steady-state response of the spheres can be separated, using short pulses, over almost the entire frequency range. In the case of backscattering, the acoustic energy, which generates the elastic echoes, penetrates the sphere at angles which do not significantly effect the backscattered specular response, and this initial backscattered echo closely replicates the response of a rigid sphere.

Once an echo is obtained from the standard spherical target, the elastic portion can be eliminated. The remaining "rigid" portion of the echo pulse can be corrected by the radius of the target sphere and corrected by the source to sphere range as given by Equation (6). The result is a replica of the incident pulse which then may be utilized in experiments on test targets. Similarly, the Form Function of a test target may be determined from Equation (9) by measuring the reflection of the test target and by using the rigid portion of the reflection from the standard target.

As with all targets, the reflectivity of the material must be included as a correction factor. The reflectivity correction factor may be easily determined for most materials from well known tables. Tungsten carbide is a particularly attractive material for use as a standard target because of its high specific acoustic impedance and because its reflectivity is nearly unity thereby making it unnecessary to include a correction factor in calibration calculations.

Figure 6:
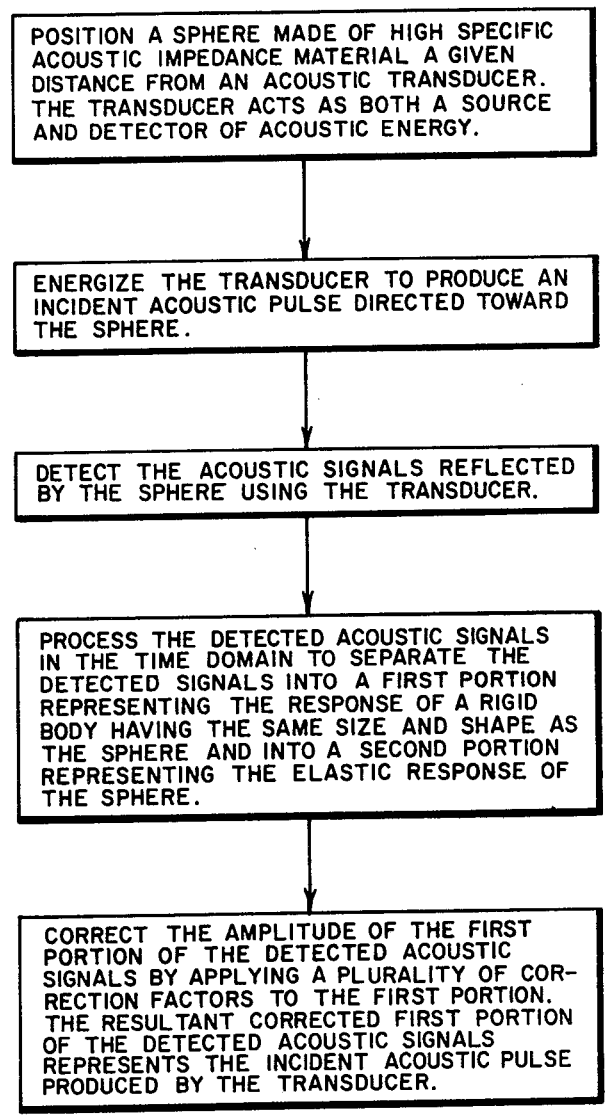
FIG. 6 is a flow diagram which summarizes the calibration method of the present Invention.

A summary of the calibration method of the present Invention is shown in the form of a flow diagram in FIG. 6.

In all of these measurements, it is important that the radius of the spherical standard target be larger than the wavelength of the acoustic pulse as discussed above with respect to Equation (1). In order that the wavefronts of the acoustic signal are fully formed before reaching the spherical target, it is desirable that the target be positioned at a distance of at least ten radii of the sphere from the source/receiver transducer. The Inventors have determined that satisfactory results are produced by an acoustic pulse having a duration of N cycles with $N \leq 0.014(f_o a)$ where $f_o$ is the center frequency of the pulse in KHz. and a is the radius of the sphere in centimeters. The skilled practitioner will, no doubt, appreciate that each of these parameters can be varied under appropriate conditions.

As discussed above, the spherical target utilized as a standard target should have a high specific acoustic impedance. Although the present Invention has been described with reference to tungsten carbide spherical targets, many other materials, particularly metals, can be used with equally good results. Tungsten carbide was used, in particular, because of its high acoustic impedance and because precisely fabricated "sizing balls" of tungsten carbide are readily commercially available items.

The present Invention has numerous advantages over prior art calibration methods as should be readily apparent to the skilled practitioner. For example, spherical targets are easily positioned in the path of incident sound thus simplifying test procedures. The ability of checking the calibration measurement itself is a distinct advantage. The quality of the calibration is always known and can be found independently of the experiment and before the experiment itself is performed. The method is firmly grounded theoretically and does not rely on approximations.

Obviously, numerous (additional) modifications and variations of the present Invention are possible in light of the above teachings. It is therefore to be understood that within the scope of the appended claims, the Invention may be practiced otherwise than as specifically described herein.

What is claimed as new and desired to be secured by letters patent of the United States is:

1. A method for calibrating acoustic backscattering instrumentation comprising the steps of:
    positioning a sphere made of high specific acoustic impedance material a given distance from an acoustic transducer, said transducer acting as both a source of acoustic energy and as a detector of acoustic energy;
    energizing said transducer such that said transducer produces an incident acoustic pulse, said incident acoustic pulse being directed toward said sphere;
    detecting acoustic signals reflected by said sphere using said transducer;
    processing said detected acoustic signals in the time domain to separate said detected signals into a first portion which represents the response of a rigid body having the same size and shape as said sphere and into a second portion representing the elastic response of said sphere; and
    correcting the amplitude of said first portion of said detected acoustic signals by applying a plurality of correction factors to said first portion, the resultant corrected first portion of said detected acoustic signals representing said incident acoustic pulse produced by said transducer.

2. The method for calibrating acoustic backscattering instrumentation as recited in claim 1, wherein said step of positioning a sphere comprises the step of:
    providing said sphere, said sphere having a radius which is larger then that of a wavelength of said incident acoustic pulse produced by said transducer.

3. The method for calibrating acoustic backscattering instrumentation as recited in claim 1 or claim 2, wherein said step of positioning a sphere comprises the step of:
    providing said sphere, said sphere being made of tungsten carbide.

4. The method of calibrating acoustic backscattering instrumentation as recited in claim 1 or claim 2, wherein said step of positioning a sphere comprises the step of:
    positioning said sphere from said transducer such that said given distance between said sphere and said transducer is at least ten times the radius of said sphere.

5. The method for calibrating acoustic backscattering instrumentation as recited in claim 1 as claim 2, wherein said step of energizing said transducer comprises the step of:
    energizing said transducer such that said transducer produces a short incident acoustic pulse having a duration of N cycles with $N \leq 0.014[f_o a]$ where $f_o$ is the center frequency of the pulse in KHz and a is the radius of the sphere in centimeters.

6. The method of calibrating acoustic backscattering instrumentation as recited in claim 1 or claim 2, wherein said step of correcting the amplitude of said first portion of said detected acoustic signals comprises the steps of:
    applying a first correction factor to said first portion of said detected acoustic signals to correct the amplitude of said first portion for said given distance between said sphere and said transducer;
    applying a second correction factor to said first portion of said detected acoustic signals to correct the amplitude of said first portion for the reflectivity of said sphere; and
    applying a third correction factor to said first portion of said deteted acoustic signals to correct the amplitude of said first portion for the radius of said sphere.

* * * * *